(12) United States Patent
Kurras et al.

(10) Patent No.: US 12,726,242 B2
(45) Date of Patent: *Sep. 1, 2026

(54) 1 BIT SIGNALING FEEDBACK TO CONFIGURE OR CHANGE THE SETTINGS OF A COMMUNICATION SYSTEM

(71) Applicant: Fraunhofer-Gesellschaft zur Foerderung der angewandten Forschung e.V., Munich (DE)

(72) Inventors: Martin Kurras, Berlin (DE); Shady Ibrahim, Berlin (DE); Thomas Wirth, Kleinmachnow (DE); Thomas Haustein, Potsdam (DE); Lars Thiele, Berlin (DE); Cornelius Hellge, Berlin (DE); Baris Göktepe, Berlin (DE); Tatiana Rykova, Berlin (DE); Thomas Schierl, Berlin (DE); Yago Sánchez De La Fuente, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,599

(22) Filed: Jun. 26, 2023

(65) Prior Publication Data

US 2023/0344482 A1 Oct. 26, 2023

Related U.S. Application Data

(63) Continuation of application No. 16/220,995, filed on Dec. 14, 2018, now Pat. No. 11,722,190, which is a (Continued)

(30) Foreign Application Priority Data

Jun. 15, 2016 (EP) .................................... 16174648

(51) Int. Cl.
*H04B 7/06* (2006.01)
*H04B 7/0456* (2017.01)

(Continued)

(52) U.S. Cl.
CPC ......... *H04B 7/0617* (2013.01); *H04B 7/0456* (2013.01); *H04B 7/0626* (2013.01);

(Continued)

(58) Field of Classification Search
None
See application file for complete search history.

(56) References Cited

U.S. PATENT DOCUMENTS 5,056,109 A 10/1991 Gilhousen et al.
2002/0094843 A1 * 7/2002 Hunzinger ........... H04B 7/0643 455/562.1

(Continued)

FOREIGN PATENT DOCUMENTS

CN 1159720 A 9/1997
CN 1925383 A 3/2007

(Continued)

OTHER PUBLICATIONS

"3rd Generation Partnership Project; Technical Specification Group Radio Access Network", Study on elevation beamforming / Full-Dimension (FD) Multiple Input Multiple Output (MIMO) for LTE (Release 13), 3GPP Standard; 3GPP TR 36.897, 3rd Generation Partnership Project, vol. RAN WG1, No. V13.0.0, France., Jul. 3, 2015, 1-58.

(Continued)

*Primary Examiner* — Brian S Roberts
(74) *Attorney, Agent, or Firm* — Perkins Coie LLP; Michael A. Glenn

(57) ABSTRACT

In a communication system, a transmitter is configured to change a transmission characteristic used for the communi- (Continued)

cation with a receiver, wherein a receiver is configured to determine a reception quality of a communication link between the transmitter and the receiver and to transmit a feedback information to the transmitter indicating whether a reception quality has changed or in which direction the reception quality has changed, or whether a transmission characteristic should be maintained, wherein the transmitter is configured to further change the transmission characteristic used for the communication with the receiver in dependence on the feedback information received from the receiver.

20 Claims, 8 Drawing Sheets

Related U.S. Application Data continuation of application No. PCT/EP2017/064437, filed on Jun. 3, 2017.

(51) Int. Cl.
*H04B 17/336* (2015.01)
*H04L 1/00* (2006.01)

(52) U.S. Cl.
CPC ......... *H04B 7/0695* (2013.01); *H04B 17/336* (2015.01); *H04L 1/0026* (2013.01)

(56) References Cited

U.S. PATENT DOCUMENTS

| | | | | |
|---|---|---|---|---|
| 2003/0011516 | A1 | 1/2003 | Moch | |
| 2003/0048760 | A1* | 3/2003 | Park | H04B 7/0408 370/335 |
| 2004/0014429 | A1* | 1/2004 | Guo | H04B 7/0632 455/73 |
| 2005/0237971 | A1 | 10/2005 | Skraparlis | |
| 2006/0046789 | A1* | 3/2006 | Huh | H04W 52/10 455/571 |
| 2006/0281422 | A1 | 12/2006 | Pan et al. | |
| 2007/0147536 | A1 | 6/2007 | Melzer et al. | |
| 2008/0080634 | A1 | 4/2008 | Kotecha et al. | |
| 2010/0002596 | A1 | 1/2010 | Wu | |
| 2010/0029317 | A1* | 2/2010 | Budampati | H04W 52/08 455/522 |
| 2011/0243272 | A1 | 10/2011 | Hammarwall et al. | |
| 2015/0016560 | A1 | 1/2015 | Kotecha et al. | |
| 2015/0249490 | A1 | 9/2015 | Chen et al. | |
| 2016/0072562 | A1 | 3/2016 | Onggosanusi et al. | |
| 2016/0072563 | A1 | 3/2016 | Lee et al. | |
| 2016/0080058 | A1 | 3/2016 | Kang et al. | |
| 2019/0123799 | A1 | 4/2019 | Kurras et al. | |
| 2019/0239268 | A1 | 8/2019 | Qin | |

FOREIGN PATENT DOCUMENTS

| | | | |
|---|---|---|---|
| CN | 101114851 | A | 1/2008 |
| CN | 102469564 | A | 5/2012 |
| CN | 104885393 | A | 9/2015 |
| CN | 105306178 | A | 2/2016 |
| CN | 105406908 | A | 3/2016 |
| CN | 105406911 | A | 3/2016 |
| CN | 109644070 | B | 3/2022 |
| WO | 2013075425 | A1 | 5/2013 |

OTHER PUBLICATIONS

Jingyu, Li, et al., "Codebook Design for Uniform Rectangular Arrays of Massive Antennas", IEEE 77th Vehicular Technology Conference, pp. 1-5, Jun. 2, 2013., 1-5.

Love, David J., et al., "An Overview of Limited Feedback in Wireless Communication Systems", IEEE Journal on Selected Areas in Communications, vol. 26, No. 8, pp. 1341-1365, Oct. 1, 2008., Oct. 1, 2008, 1341-1365.

Nam, Young-Han, et al., "Full Dimension MIMO for LTE-Advanced and 5G", 015 Information Theory and Applications Workshop, IEEE, pp. 143-148, Feb. 1, 2015., 143-148.

Ping, Yu, et al., "Closed loop transmit diversity and power control with single bit feedback", Proceedings. 2005 International Conference on Wireless Communications, Networking and Mobile Computing, 2005., 2005, pp. 484-487, doi: 10.1109/WCNM.2005.1544087. (Year: 2005).

* cited by examiner 10
set of configurations N
13
noise
12
11
14
transmitter
channel
receiver
feedback: config n
30

10
12
16
18
22
20
14
stream 1
stream I
precoding
$N_t$
$N_t$
demodulation
stream 1
stream I
CSI extractor
24
codebook
codeword selection
28
codebook
30
32
uplink feedback
26

122
124
120
130
150
receiver
152

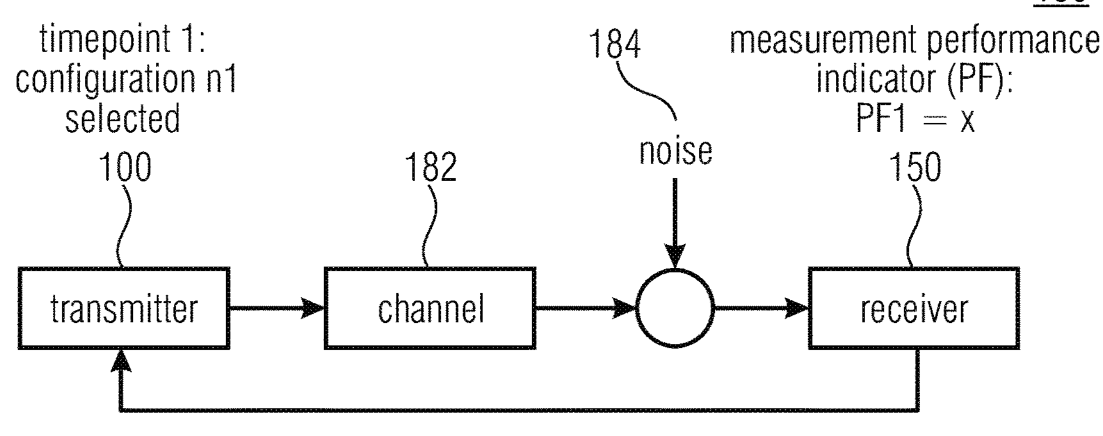
Fig. 6a
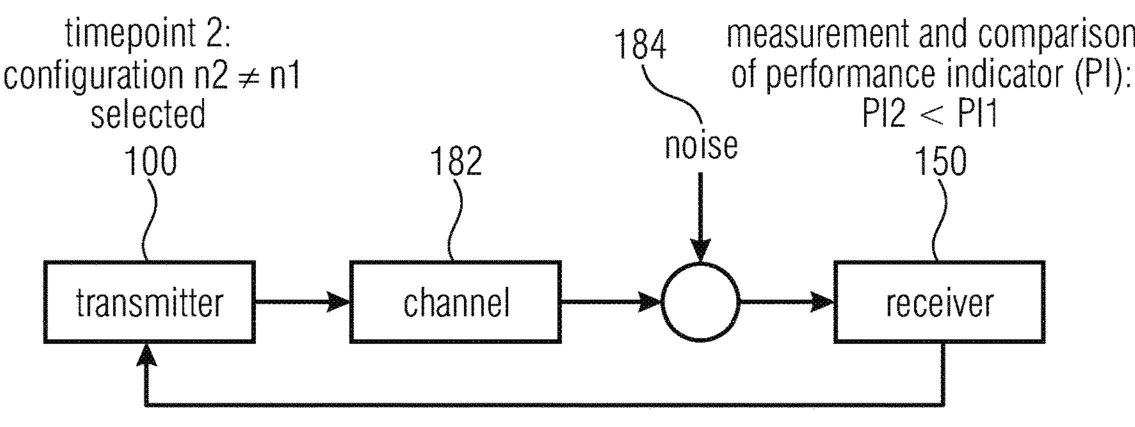
Fig. 6b
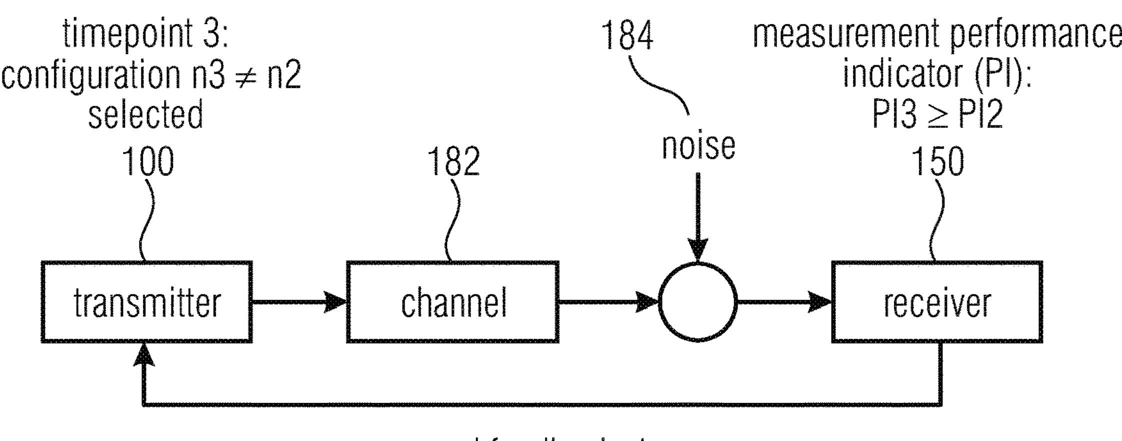
Fig. 6c

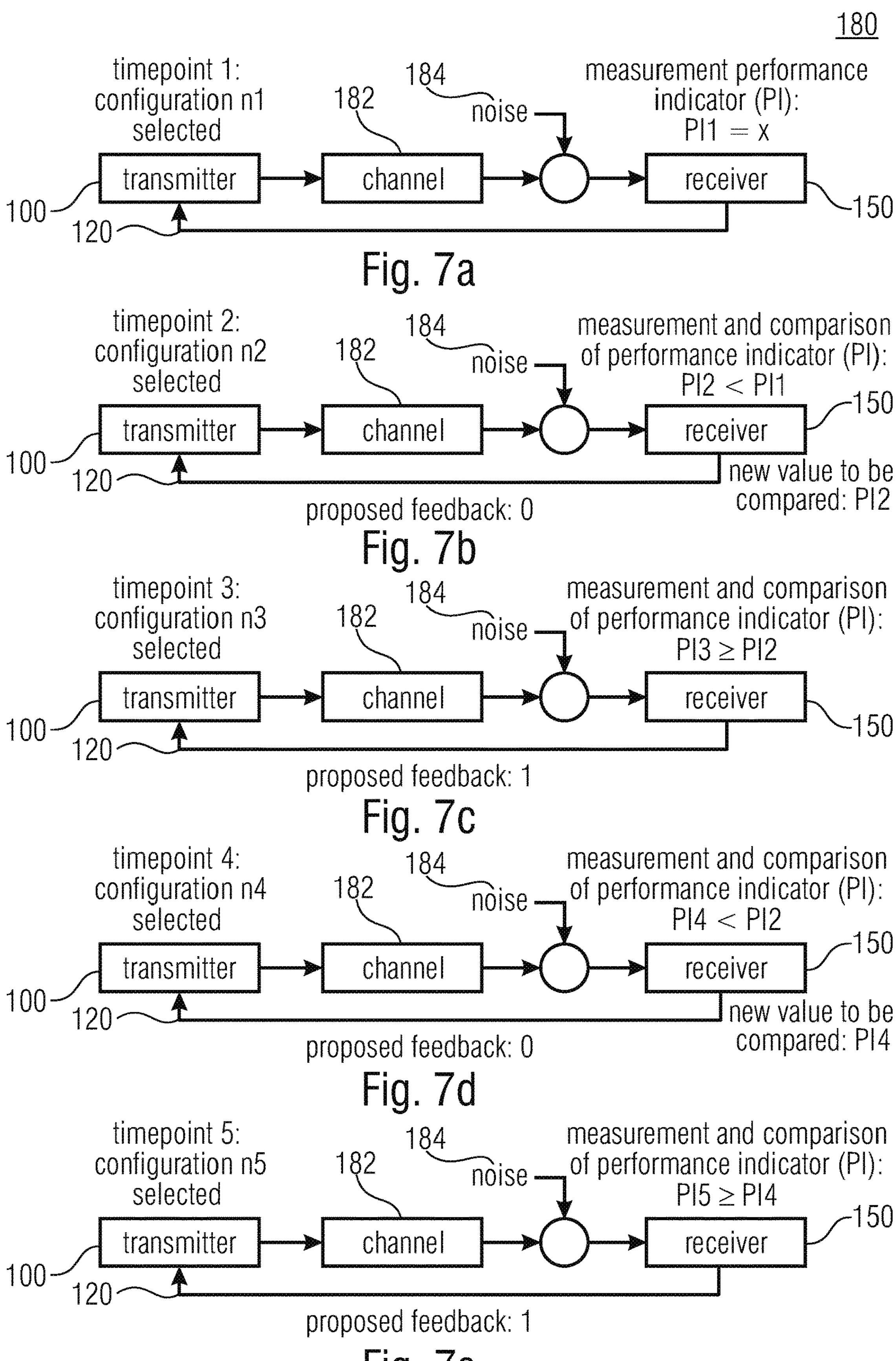
180
timepoint 1:
configuration n1
selected
182
184
noise
measurement performance
indicator (PI):
PI1 = x
transmitter
channel
receiver
100
120
150
Fig. 7a
timepoint 2:
configuration n2
selected
182
184
noise
measurement and comparison
of performance indicator (PI):
PI2 < PI1
transmitter
channel
receiver
100
120
150
new value to be
compared: PI2
proposed feedback: 0
Fig. 7b
timepoint 3:
configuration n3
selected
182
184
noise
measurement and comparison
of performance indicator (PI):
PI3 ≥ PI2
transmitter
channel
receiver
100
120
150
proposed feedback: 1
Fig. 7c
timepoint 4:
configuration n4
selected
182
184
noise
measurement and comparison
of performance indicator (PI):
PI4 < PI2
transmitter
channel
receiver
100
120
150
new value to be
compared: PI4
proposed feedback: 0
Fig. 7d
timepoint 5:
configuration n5
selected
182
184
noise
measurement and comparison
of performance indicator (PI):
PI5 ≥ PI4
transmitter
channel
receiver
100
120
150
proposed feedback: 1
Fig. 7e

1 BIT SIGNALING FEEDBACK TO CONFIGURE OR CHANGE THE SETTINGS OF A COMMUNICATION SYSTEM

CROSS-REFERENCE TO RELATED APPLICATIONS

This application is a continuation of U.S. patent application Ser. No. 16/220,955, filed Dec. 14, 2018, which is a continuation of copending International Application No. PCT/EP2017/064437, filed Jun. 13, 2017, which is incorporated herein by reference in its entirety, and additionally claims priority from European Application No. EP 16174648.2, filed Jun. 15, 2016, which is incorporated herein by reference in its entirety.

BACKGROUND OF THE INVENTION

In any communication system, consisting of a transmitter and receiver communicating over a noisy channel, where the configuration of the system is obtained by a feedback from the receiver to the transmitter, resources are useful. FIG. 1 shows a schematic block diagram of such a communication system 10 comprising a transmitter 12 and a receiver 14 communicating over a channel 11 overlayed with noise 13. Whenever, the set of possible configuration becomes large, also the feedback 30 selecting a specific configuration becomes large. Thus a limited feedback channel 30 also limits the number of possible configurations to choose from.

The communication system can be a wired communication system, such as Ethernet, or a wireless communication system, such as WLAN (WLAN=wireless local area network), GSM (GSM=global system mobile), UMTS (UMTS=universal mobile telecommunication system) and LTE (LTE=long term evolution).

The settings of the communication system to be changed or configured using the feedback channel 30 can be the modulation and/or code rates to select from, the set of transmitters and combinations thereof, in a wireless system with a multi-antenna transmitter, the number of beamformers/precoders, and in a wireless system with a pool of resources, e.g. in frequency, space or code domain.

In the latest finished LTE release 12 up to eight antennas and multiplexed stream are considered. The trend to more antennas and thus gaining sum spectral efficiency by multiplexing more streams goes on, e.g. in the study item in release 13 called "Study on Elevation Beamforming/Full-Dimension (FD) MIMO for LTE" [3GPP, "Study on Elevation Beamforming/Full-Dimension (FD) MIMO for LTE", 3rd Generation Partnership Project, vol. V13.0.0, Jul. 2015] where up to 64 antennas and 16 streams are considered. Scaling up the present mechanism of LTE results in an increase of overhead and signaling in the downlink, due to the insertion of reference signals (RS) and Channel State Information Reference Signals (CSI-RS) in the physical downlink shared channel (PDSCH). The principal signal flow for precoded downlink MIMO in a Frequency Division Duplex (FDD) system is depicted in FIG. 2.

FIG. 2 shows a signal flow in a precoded downlink MIMO FDD system from [Li, J., Su, X., Zeng, J., Zhao, Y., Yu, S., Xiao, L., & Xu, X. (2013, June). Codebook design for uniform rectangular arrays of massive antennas. In Vehicular Technology Conference (VTC Spring), 2013 IEEE 77th (pp. 1-5). IEEE]. In detail, FIG. 2 shows a schematic block diagram of a MIMO system 10 comprising a multi-antenna transmitter 12 and a multi-antenna receiver 14. The multi-antenna transmitter 12 comprises a precoder (precoding unit) 16 and a plurality of Antennas 18 (e.g., $N_t$ antennas, wherein $N_t$ is a natural number greater than or equal to two, $N_t \geq 2$) connected to the precoder 16. The multi-antenna receiver 14 comprises a demodulator (or demodulation unit) 20 and a plurality of antennas 22 (e.g., $N_r$ antennas, wherein $N_r$ is a natural number greater than or equal to two, $N_r \geq 2$) connected to the demodulator 20. Further, the multi-antenna receiver 14 comprises a CSI extractor 24 (CSI=channel state information), a codebook 26 and a codeword selector 28. The CSI extractor 24 is configured to extract a channel state information. The codebook 26 comprises a plurality of codewords. Each codeword can be associated with a codebook index. The codeword selector is configured to select one of the codewords of the codebook based on the channel state information provided by the CSI extractor 24. The multi-antenna receiver 14 is configured to transmit the codebook index of the selected codeword to the multi-antenna transmitter 12 using an uplink feedback 30. The multi-antenna transmitter 12 also comprises a codebook 32 comprising a plurality of codewords, wherein the codebook 32 is configured to select one of the codewords based on the codebook index received from the multi-antenna receiver 14 over the uplink feedback 30 and to provide the selected codeword to the precoder 16.

Due to the insertion of the SR and CSI-RS in the PDSCH the codebook size and therefore codeword selection at the receiver is limited. It is known from literature that a limited codebook of beamformers/precoders (used interchangeable in this document) also limits the performance by beamforming gain. A codebook is a quantization of the channel and results in a mismatch (loss in in beamforming gain) compared to precoding with perfect Channel State Information (CSI) at the transmitter [D. Love, R. Heath, V. Lau, D. Gesbert, B. Rao and M. Andrews, "An overview of limited feedback in wireless communication systems", Selected Areas in Communications, IEEE Journal on, vol. 26, pp. 1341-1365, October. 2008].

Similar to the simulation assumptions in [3GPP, "Study on Elevation Beamforming/Full-Dimension (FD) MIMO for LTE", 3rd Generation Partnership Project, vol. V13.0.0, Jul. 2015] the possible gain from an increased codebook size is given in FIG. 3. In detail, FIG. 3 shows in a diagram a SINR (signal-to-interference-plus-noise ratio) gain from increased codebook size in a full-dimension MIMO downlink transmission, similar to the study item assumptions in LTE release 13 [3GPP, "Study on Elevation Beamforming/Full-Dimension (FD) MIMO for LTE", 3rd Generation Partnership Project, vol. V13.0.0, Jul. 2015]. In FIG. 3, approximately 10 dB gain in SINR from 16 to 200 beamformers can be observed. Therefore, it would desirable to have a larger codebook without additional signaling overhead in order to increase the spectral efficiency by increased beamforming gains.

In the study item "Study on Elevation Beamforming/Full-Dimension (FD) MIMO for LTE" [3GPP, "Study on Elevation Beamforming/Full-Dimension (FD) MIMO for LTE", 3rd Generation Partnership Project, vol. V13.0.0, Jul. 2015] the problem is solved by increasing straight forward the amount of reference signals (RS) and Channel State Information Reference Signals (CSI-RS) in the physical downlink shared channel (PDSCH). There is a trade-off between decreasing the efficiency of the PDSCH and the gain from spatial multiplexing of a larger number of streams. Even by limiting the number of streams, e.g. to 16, there is still a gain expected from an increased codebook size, or higher quantization of the CSI.

US 2015/0016560 A1 discloses a system and method for precoding feedback in MIMO communication systems. In detail, in a closed-loop wireless communication system, a codebook-based feedback mechanism is provided to enable non-unitary precoding for multi-stream transmission, where in each stream is optimized with suitable transmission power allocation and AMC. The codebook-based feedback mechanism uses a precoding codebook having a power allocation matrix which is constrained to specify that beamforming applies full power to a predetermined beam. With this constraint, a one-bit power allocation feedback index may be used to switch between beamforming and spatial multiplexing.

SUMMARY

Embodiments relate to a transmitter and a receiver. Further embodiments relate to a method for transmitting and a method for receiving. Some embodiments relate to a 1 bit signaling feedback to configure or change the settings of a communication system. Some embodiments relate to a 1 bit signaling feedback to improve performance for full-dimension MIMO.

An embodiment may have a transmitter for communicating with a receiver, wherein the transmitter is configured to change a transmission characteristic used for the communication with the receiver, wherein the transmitter is configured to further change the transmission characteristic used for the communication with the receiver in dependence on a feedback information received from the receiver, the feedback information indicating whether a reception quality has changed or in which direction the reception quality has changed, or whether the transmission characteristic should be maintained.

Another embodiment may have a receiver, configured to establish a communication link with a transmitter, wherein the receiver is configured to determine a reception quality of the communication link, wherein the receiver is configured to transmit a feedback information to the transmitter indicating whether a reception quality has changed or in which direction the reception quality has changed, or whether a transmission characteristic should be maintained.

According to an embodiment, a system may have: a transmitter for communicating with a receiver, wherein the transmitter is configured to change a transmission characteristic used for the communication with the receiver, wherein the transmitter is configured to further change the transmission characteristic used for the communication with the receiver in dependence on a feedback information received from the receiver, the feedback information indicating whether a reception quality has changed or in which direction the reception quality has changed, or whether the transmission characteristic should be maintained; and an inventive receiver.

According to an embodiment, a method for transmitting may have the steps of: establishing a communication link to a receiver; changing a transmission characteristic used for communication with the receiver; further changing the transmission characteristic used for the communication with the receiver in dependence on a feedback information received from the receiver, the feedback information indicating whether a reception quality has changed or in which direction the reception quality has changed, or whether a transmission characteristic should be maintained.

According to another embodiment, a method for receiving may have the steps of: establishing a communication link with a transmitter; determining a reception quality of the communication link; and transmitting a feedback information to the transmitter indicating whether a reception quality has changed or in which direction the reception quality has changed, or whether a transmission characteristic should be maintained.

An embodiment may have a non-transitory digital storage medium having a computer program stored thereon to perform the method for transmitting, the method including: establishing a communication link to a receiver; changing a transmission characteristic used for communication with the receiver; further changing the transmission characteristic used for the communication with the receiver in dependence on a feedback information received from the receiver, the feedback information indicating whether a reception quality has changed or in which direction the reception quality has changed, or whether a transmission characteristic should be maintained; when said computer program is run by a computer.

Another embodiment may have a non-transitory digital storage medium having a computer program stored thereon to perform the method for receiving, the method including: establishing a communication link with a transmitter; determining a reception quality of the communication link; and transmitting a feedback information to the transmitter indicating whether a reception quality has changed or in which direction the reception quality has changed, or whether a transmission characteristic should be maintained; when said computer program is run by a computer.

An embodiment may have a transmitter for communicating with a receiver, wherein the transmitter is configured to change a transmission characteristic used for the communication with the receiver, wherein the transmitter is configured to further change the transmission characteristic used for the communication with the receiver in dependence on a feedback information received from the receiver, the feedback information indicating whether a reception quality has changed or in which direction the reception quality has changed, or whether the transmission characteristic should be maintained; wherein the transmitter is configured to iteratively further change the transmission characteristic used for the communication with the receiver in dependence on the feedback information received from the receiver.

Another embodiment may have a receiver, configured to establish a communication link with a transmitter, wherein the receiver is configured to determine a reception quality of the communication link, wherein the receiver is configured to transmit a feedback information to the transmitter indicating whether a reception quality has changed or in which direction the reception quality has changed, or whether a transmission characteristic should be maintained; wherein the receiver is configured to transmit the feedback information to the transmitter in response to an iterative change of the transmission characteristic used by the transmitter for the communication with the receiver.

Embodiments provide a transmitter for communicating with a receiver, wherein the transmitter is configured to change a transmission characteristic used for the communication with the receiver, wherein the transmitter is configured to further change the transmission characteristic used for the communication with the receiver in dependence on a feedback information received from the receiver, the feedback information indicating whether a reception quality has changed or in which direction the reception quality has changed, or whether the transmission characteristic should be maintained.

Further embodiments provide a receiver, configured to establish a communication link with a transmitter, wherein the receiver is configured to determine a reception quality of the communication link, wherein the receiver is configured to transmit a feedback information to the transmitter indicating whether a reception quality has changed or in which direction the reception quality has changed, or whether a transmission characteristic should be maintained.

According to the concept of the present invention, a feedback information (e.g., a 1 bit feedback information) transmitted from the receiver to the transmitter is used for indicating to the transmitter whether a reception quality has changed or in which direction the reception quality has changed, or whether the transmission characteristic should be maintained. Based on the feedback information, the transmitter can adapt its transmission characteristic used for the communication with the receiver.

Further embodiments provide a method for transmitting, the method comprising:

- establishing a communication link to a receiver;
- changing a transmission characteristic used for communication with the receiver; and
- further changing the transmission characteristic used for the communication with the receiver in dependence on a feedback information received from the receiver, the feedback information indicating whether a reception quality has changed or in which direction the reception quality has changed, or whether a transmission characteristic should be maintained.

Further embodiments provide a method for receiving, the method comprising:

- establishing a communication link with a transmitter;
- determining a reception quality of the communication link; and
- transmitting a feedback information to the transmitter indicating whether a reception quality has changed or in which direction the reception quality has changed, or whether a transmission characteristic should be maintained.

Advantageous implementations are addressed in the dependent claims.

In embodiments, the feedback information can comprise exactly 1 bit.

The feedback information can comprise a first value when a value of the reception quality detected by the receiver is greater than a reference value and a second value, different from the first value, when a value of the reception quality detected by the receiver is equal to or smaller than the reference value. The reference value can be a previous value of the reception quality or a minimum or maximum value of a plurality of previous values of the reception quality.

The feedback information can comprise a first value when a value of the reception quality detected by the receiver is smaller than a reference value and a second value, different from the first value, when a value of the reception quality detected by the receiver is equal to or greater than the reference value. The reference value can be a previous value of the reception quality or a minimum or maximum value of a plurality of previous values of the reception quality.

In embodiments, the reception quality can be at least one out of a signal-to-interference-plus-noise ratio, a signal-to-noise ratio, a channel quality indicator, a received signal power and an effective data throughput.

In embodiments, the transmission characteristic can be at least one out of a transmit power, a code rate, a set of scheduled resources, a beamforming pattern, a precoder setting, and a set of access nodes for coordinated transmissions in a single frequency network.

In embodiments, in a first operation mode, the transmitter can be configured to select one out of a plurality of different transmission characteristics for communication with the receiver in dependence on a selection information received from the receiver.

In embodiments, in a first operation mode, the transmitter can be configured to randomly select one out of a plurality of different transmission characteristics for communication with the receiver.

In embodiments, in a first operation mode, the transmitter can be configured to select a default transmission characteristic.

In embodiments, in a second operation mode, the transmitter can be configured to change the transmission characteristic used for communication with the receiver, wherein the transmitter can be configured to further change the transmission characteristic used for the communication with the receiver in dependence on the feedback information received from the receiver.

The transmitter can be configured to switch to the first operation mode for establishing the communication link between the transmitter and the receiver. Further, the transmitter can be configured to switch to the second operation mode for a period of time encompassing at least two changes of the transmission characteristic.

The transmitter can be configured to signal a change of mode of operation to the receiver.

Alternatively, the transmitter can be configured to change the mode of operation in dependence on a signal information received from the receiver.

The transmitter can be configured to not use a downlink channel from the transmitter to the receiver for transmitting control information (e.g., reference signals, pilots) in the second operation mode, the control information indicating the used transmission characteristic to the receiver.

In embodiments, the transmitter cab be configured to iteratively further change the transmission characteristic used for the communication with the receiver in dependence on the feedback information received from the receiver.

In embodiments, the transmitter can comprise a plurality of antennas, wherein the transmission characteristic can be a beam pattern, wherein the transmitter can be configured to change or further change the beam pattern by changing a direction of a main lobe of the beam pattern.

The transmitter can be configured to change the direction of the main lobe in the same direction when the feedback information indicates a higher reception quality. Further, the transmitter can be configured to change the direction of the main lobe in a different direction when the feedback information indicates a lower reception quality.

The transmitter can be configured to change or further change the beam pattern by continuously changing a main lobe of the beam pattern in the same direction until the feedback information indicates that the characteristic of the beam pattern should be maintained.

In embodiments, in a first operation mode, the receiver can be configured to select one out of a plurality of different transmission characteristics in dependence on the determined reception quality, and to transmit a selection information to the transmitter indicating the one transmission characteristic out of the plurality of different transmission characteristics to be used by the transmitter.

In embodiments, in a second operation mode, the receiver can be configured to transmit the feedback information to the transmitter.

The receiver can be configured to switch to the first operation mode for establishing the communication link between the transmitter and the receiver. Further, the receiver can be configured to switch to the second operation mode for a period of time encompassing at least two changes of the transmission characteristic.

The receiver can be configured to switch to the first operation mode or to the second operation mode in dependence on a signaling information received from the transmitter. Alternatively, the receiver can be configured to switch to the first operation mode or to the second operation mode and to signal the current operation mode to the transmitter.

The receiver can be configured to not use a downlink channel from the transmitter to the receiver for receiving control information in the second operation mode, the control information indicating the used transmission characteristic to the receiver.

Further embodiments provide a multi-antenna transmitter configured to establish a communication link to a receiver, wherein the multi-antenna transmitter is configured to change a beamforming pattern used for communication with the receiver, wherein the multi-antenna transmitter is configured to further change the beamforming pattern used for the communication with the receiver in dependence on a feedback information received from the receiver, the feedback information indicating whether a received SINR has changed or in which direction the received SINR has changed, or whether a characteristic of the beam pattern should be maintained.

In embodiments, the feedback information comprises exactly 1 bit.

In embodiments, in a first operation mode, the multi-antenna transmitter can be configured to select one out of a plurality of different beamforming patterns for communication with the receiver in dependence on a selection information received from the receiver, the selection information indicating the one beamforming pattern out of the plurality of different beamforming patterns to be used by the multi-antenna transmitter.

In embodiments, in a second operation mode, the multi-antenna transmitter can be configured to change the beamforming pattern used for communication with the receiver, wherein the multi-antenna transmitter can be configured to further change the beamforming pattern used for the communication with the receiver in dependence on the feedback information received from the receiver.

The multi-antenna transmitter can be configured to switch to the first operation mode for establishing the communication link between the multi-antenna transmitter and the receiver, and wherein the multi-antenna transmitter can be configured to switch to the second operation mode for a period of time encompassing at least two changes of the beam pattern.

The multi-antenna transmitter can be configured to signal a change of mode to the receiver.

The multi-antenna transmitter can be a LTE transmitter. Thereby, the multi-antenna transmitter can be configured to not use the PDSCH in the second operation mode for transmitting control information, the control information indicating the used beam pattern to the receiver.

In embodiments, the multi-antenna transmitter can be configured to iteratively further change the beamforming pattern used for the communication with the receiver in dependence on the feedback information received from the receiver.

In embodiments, the multi-antenna transmitter can be configured to change or further change the beam pattern by changing a direction of a main lobe of the beam pattern.

The multi-antenna transmitter can be configured to change the direction of the main lobe in the same direction when the feedback information indicates a higher SINR. Further, the multi-antenna transmitter can be configured to change the direction of the main lobe in a different direction when the feedback information indicates a lower SINR.

In embodiments, the multi-antenna transmitter can be configured to change or further change the beam pattern by changing a direction of a main lobe of the beam pattern in azimuth direction and elevation direction separately after each other.

In embodiments, the multi-antenna transmitter can be configured to change or further change the beam pattern by continuously changing a main lobe of the beam pattern in the same direction until the feedback information indicates that the characteristic of the beam pattern should be maintained.

Further embodiments provide a receiver, configured to establish a communication link with a multi-antenna transmitter, wherein the receiver is configured to determine a SINR of the communication link, wherein the receiver is configured to transmit a feedback information to the multi-antenna transmitter indicating whether a received SINR has changed or in which direction the received SINR has changed, or whether a characteristic of the beam pattern should be maintained.

In embodiments, the feedback information comprises exactly 1 bit.

In embodiments, in a first operation mode, the receiver can be configured select one out of a plurality of different beamforming patterns in dependence on the determined SINR, and to transmit a selection information to the multi-antenna transmitter indicating the one beamforming pattern out of the plurality of different beamforming patterns to be used by the multi-antenna transmitter.

In embodiments, in a second operation mode, the receiver can be configured to transmit the feedback information to the multi-antenna transmitter.

The receiver can be configured to switch to the first operation mode for establishing the communication link between the multi-antenna transmitter and the receiver. Further, the receiver can be configured to switch to the second operation mode for a period of time encompassing at least two changes of the beam pattern.

The receiver can be configured to switch to the first operation mode or to the second information in dependence on a signaling information received from the multi-antenna transmitter.

The receiver can be a LTE receiver. Thereby, the receiver can be configured to not use the PDSCH in the second operation mode for signaling control information, the control information indicating the selected beam pattern out of the plurality of different beam patterns selected by the multi-antenna transmitter.

Further embodiments provide a method for multi-antenna transmitting, the method comprising:

- establishing a communication link to a receiver;
- changing a beamforming pattern used for communication with the receiver; and
- further changing the beamforming pattern used for the communication with the receiver in dependence on a feedback information received from the receiver, the feedback information indicating whether a received SINR has changed or in which direction the received SINR has changed, or whether a characteristic of the beam pattern should be maintained.

Further embodiments provide a method for receiving, the method comprising:

establishing a communication link with a multi-antenna transmitter;

determining a SINR of the communication link; and transmitting a feedback information to the multi-antenna transmitter indicating whether a received SINR has changed or in which direction the received SINR has changed, or whether a characteristic of the beam pattern should be maintained.

BRIEF DESCRIPTION OF THE DRAWINGS

Embodiments of the present invention will be detailed subsequently referring to the appended drawings, in which:

FIGS. 6*a*-6*c* show schematic block diagrams of a communication system comprising a transmitter and a receiver at different time points;

FIGS. 7*a*-7*e* show schematic block diagrams of a communication system comprising a transmitter and a receiver at different time points;

DETAILED DESCRIPTION OF THE INVENTION

Figures 1, 2:
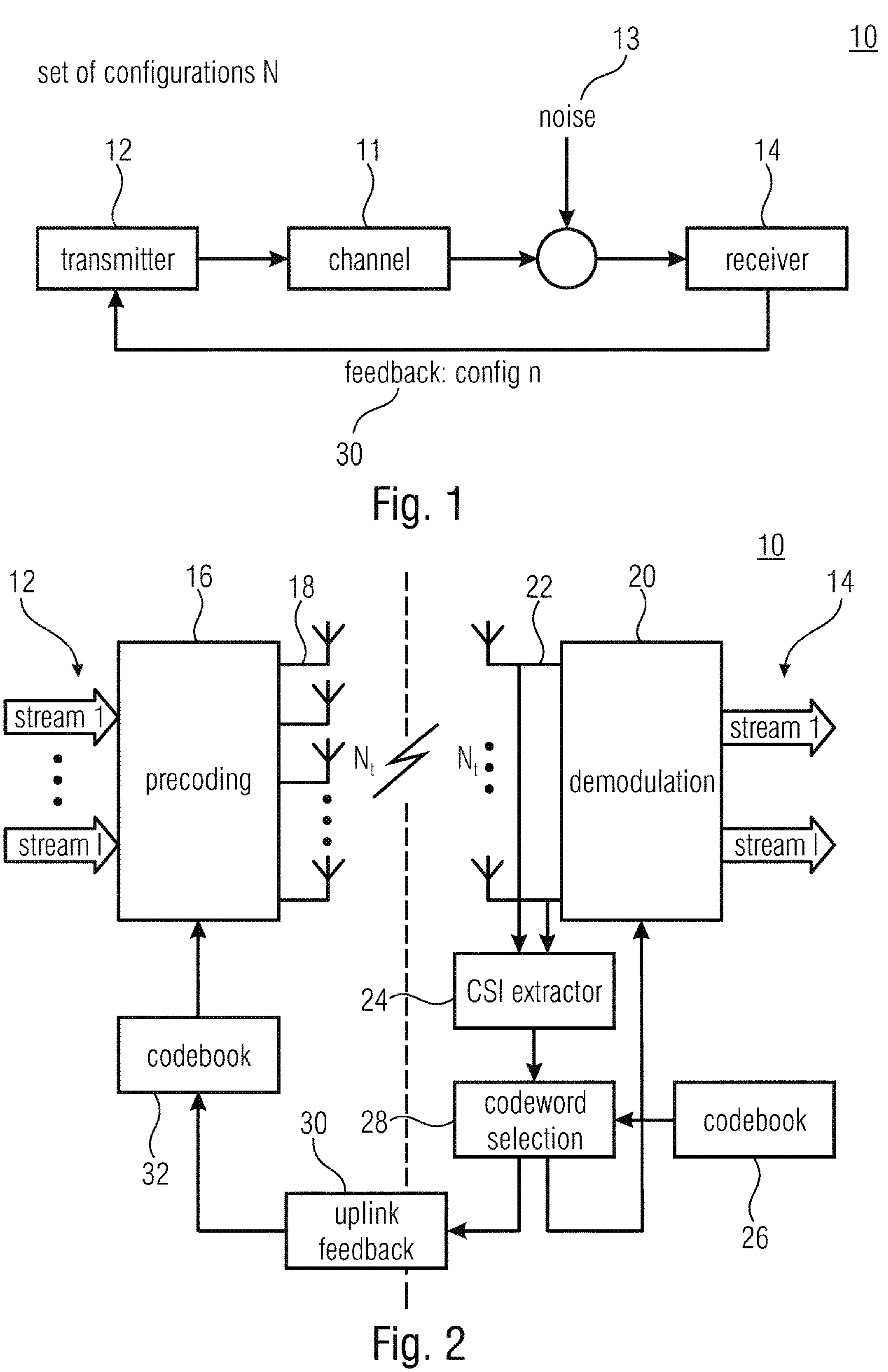
FIG. 1 shows a schematic block diagram of a conventional communication system.
FIG. 2 shows a schematic block diagram of a conventional MIMO system.
Figure 3:
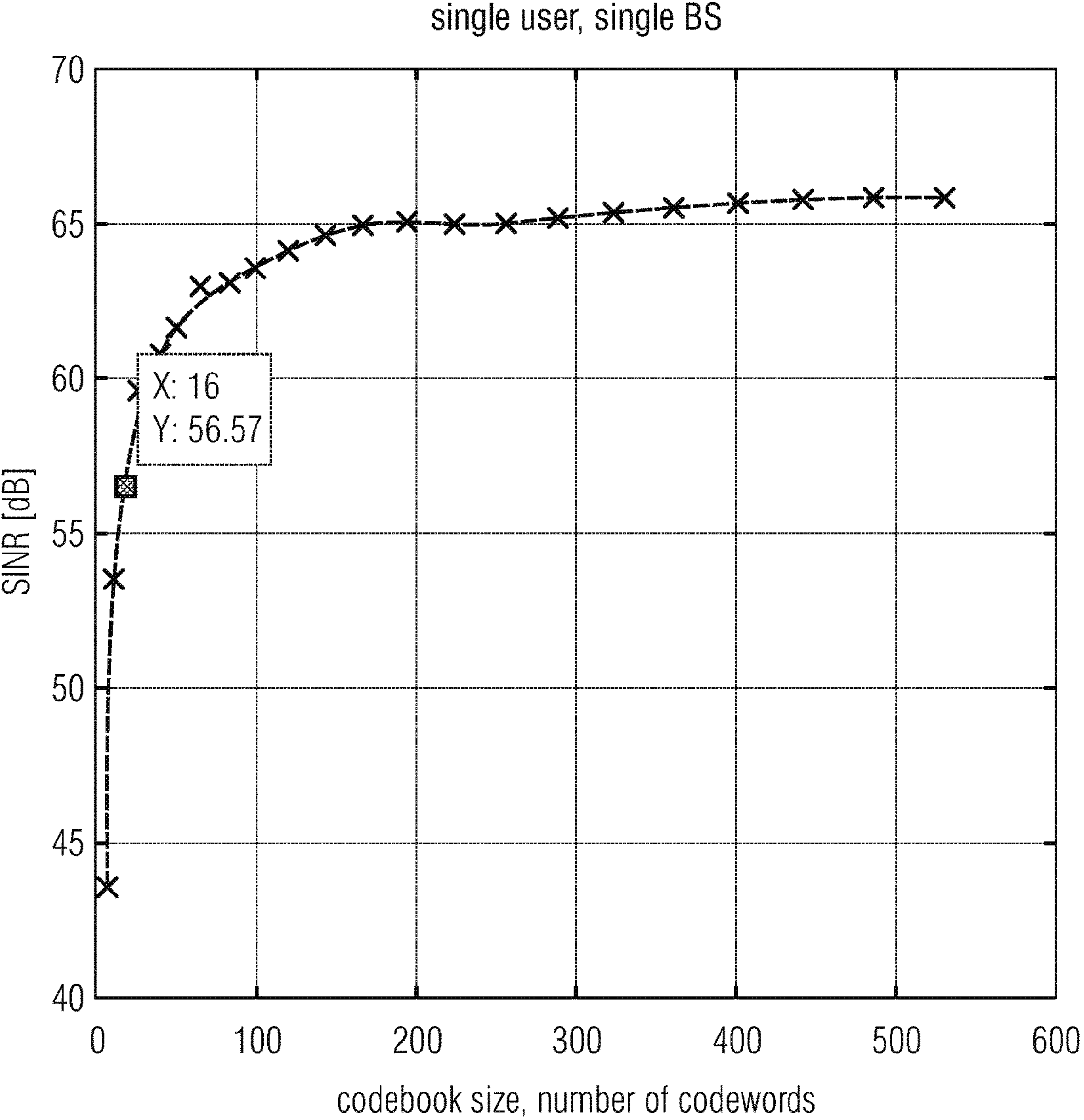
FIG. 3 shows in a diagram a SINR in dB plotted over a codebook size in number of codewords for a single user and a single base station.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figures 4, 5:
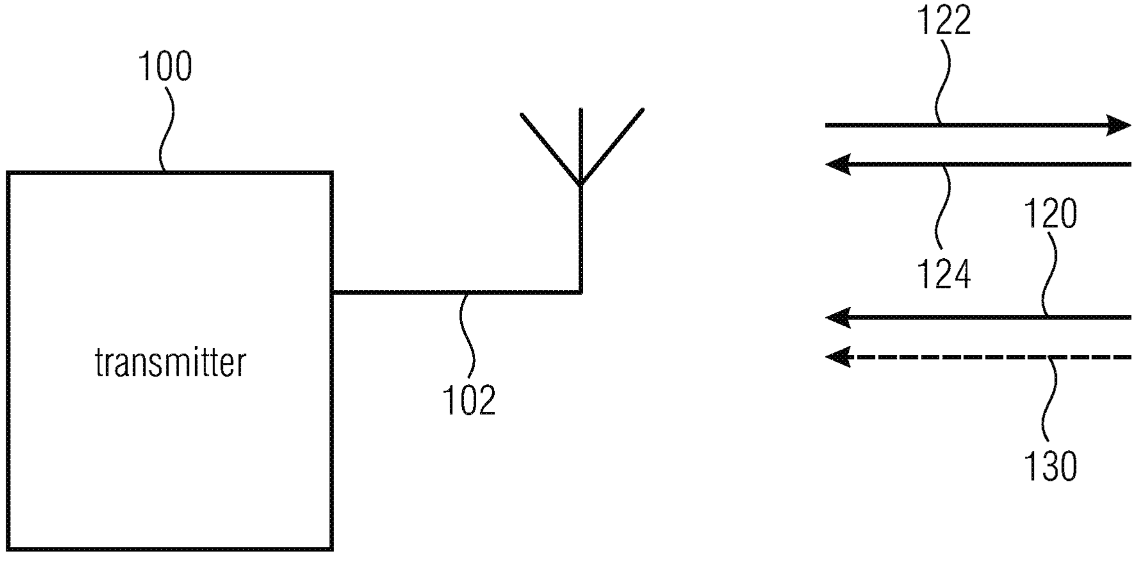
FIG. 4 shows a schematic block diagram of a transmitter according to an embodiment.
FIG. 5 shows a schematic block diagram of a receiver according to an embodiment.

FIG. 4 shows a schematic block diagram of a transmitter 100 for communicating with a receiver, according to an embodiment of the present invention. The transmitter 100 is configured to change a transmission characteristic used for the communication with the receiver, wherein the transmitter 100 is configured to further change the transmission characteristic used for the communication with the receiver in dependence on a feedback information 120 received from the receiver, the feedback information 120 indicating whether a reception quality has changed or in which direction the reception quality has changed, or whether the transmission characteristic should be maintained.

In embodiments, the transmitter 100 can comprise at least one antenna 102, e.g., for transmitting signals 122 to the receiver and/or receiving signals 124 from the receiver. Thus, the transmitter 100 can be a transceiver.

In embodiments, the feedback information 120 can comprise exactly 1 bit.

For example, the feedback information 120 can comprise a first value (e.g., logic 1) when a value of the reception quality detected by the receiver is greater than a reference value and a second value (e.g., logic 0), different from the first value, when a value of the reception quality detected by the receiver is equal to or smaller than the reference value. Naturally, the feedback information can also comprise a first value (e.g., logic 1) when a value of the reception quality detected by the receiver is smaller than a reference value and a second value (e.g., logic 0) when a value of the reception quality detected by the receiver is equal to or greater than the reference value. The reference value can be a previous value of the reception quality or a minimum or maximum value of a plurality of previous values of the reception quality.

The reception quality can be at least one out of a signal-to-interference-plus-noise ratio (SINR), a signal-to-noise ratio (SNR), a channel quality indicator (CQI), a received signal power and an effective data throughput (considering coding overhead and block errors), an interference power level.

The transmission characteristic can be at least one out of a transmit power, a code rate, a set of scheduled resources, a beamforming pattern, a precoder setting, and a set of access nodes (e.g., a set of serving or interfering transmitters) for coordinated transmissions in a single frequency network.

In embodiments, the transmitter 100 can be configured to iteratively further change the transmission characteristic used for the communication with the receiver in dependence on the feedback information 120 received from the receiver.

In embodiments, the transmitter 100 can be configured to switch between a first operation mode and a second operation mode.

In the first operation mode, the transmitter 100 can be configured to select one out of a plurality of different transmission characteristics for communication with the receiver in dependence on a selection information 130 received from the receiver. Further (e.g., alternatively), in the first operation mode, the transmitter 100 can be configured to randomly select one out of a plurality of different transmission characteristics for communication with the receiver. Further (e.g., alternatively), in the first operation mode, the transmitter 100 can be configured to select a default transmission characteristic.

In the second operation mode, the transmitter 100 can be configured to change the transmission characteristic used for communication with the receiver, wherein the transmitter 100 can be configured to further change the transmission characteristic used for the communication with the receiver in dependence on the feedback information received from the receiver.

The transmitter 100 can be configured to switch to the first operation mode for establishing the communication link between the transmitter 100 and the receiver, and to switch to the second operation mode after having established the communication link between the transmitter 100 and the receiver, e.g., for a given period of time, the period of time encompassing, for example, at least two changes of the transmission characteristic.

Further, the transmitter 100 can be configured to signal a change of mode of operation to the receiver. Alternatively, the transmitter 100 can be configured to change the mode of operation in dependence on a signal information received from the receiver.

Furthermore, the transmitter 100 can be configured to not use a downlink channel from the transmitter to the receiver for transmitting control information in the second operation mode, the control information indicating the used transmission characteristic to the receiver. For example, no signaling from the transmitter to the receiver is used, so it is transparent to the receiver, no additional signaling overhead is added.

FIG. 5 shows a schematic block diagram of a receiver 150 for communicating with a transmitter 100, according to an embodiment of the present invention. The receiver 150 is configured to establish a communication link with a transmitter 100, wherein the receiver 150 is configured to determine a reception quality of the communication link, wherein the receiver 150 is configured to transmit a feedback information 120 to the transmitter 100 indicating whether a reception quality has changed or in which direction the reception quality has changed, or whether a transmission characteristic should be maintained.

In embodiments, the receiver 150 can comprise at least one antenna 152, e.g., for transmitting signals 124 to the transmitter 100 and/or receiving signals 122 from the transmitter. The receiver 150 can be a transceiver.

In embodiments, the feedback information 120 can comprise exactly 1 bit.

For example, the feedback information 120 can comprise a first value (e.g., logic 1) when a value of the reception quality detected by the receiver is greater than a reference value and a second value (e.g., logic 0), different from the first value, when a value of the reception quality detected by the receiver is equal to or smaller than the reference value. Naturally, the feedback information can also comprise a first value (e.g., logic 1) when a value of the reception quality detected by the receiver is smaller than a reference value and a second value (e.g., logic 0) when a value of the reception quality detected by the receiver is equal to or greater than the reference value. The reference value can be a previous value of the reception quality or a minimum or maximum value of a plurality of previous values of the reception quality.

In embodiments, the receiver 150 can be configured to switch between a first operation mode and a second operation mode.

In the first operation mode, the receiver 150 can be configured select one out of a plurality of different transmission characteristics in dependence on the determined reception quality, and to transmit a selection information 130 to the transmitter indicating the one transmission characteristic out of the plurality of different transmission characteristics to be used by the transmitter.

In the second operation mode the receiver 150 can be configured to transmit the feedback information 120 to the transmitter 100.

The receiver 150 can be configured to switch to the first operation mode for establishing the communication link or communication channel between the transmitter 100 and the receiver 150, and to switch to the second operation mode after having established the communication link of communication channel between the transmitter 100 and the receiver 150, e.g., for a given period of time, the period of time encompassing, for example, at least two changes of the transmission characteristic.

Further, the receiver 150 can be configured to switch to the first operation mode or to the second operation mode in dependence on a signaling information received from the transmitter 100.

Alternatively, the receiver 150 can be configured to switch to the first operation mode or to the second operation mode and to signal the current operation mode to the transmitter.

Furthermore, the receiver 150 can be configured to not use a downlink channel from the transmitter to the receiver for receiving control information in the second operation mode, the control information indicating the used transmission characteristic to the receiver.

In embodiments, a feedback information (e.g., a 1 bit feedback) is send from the receiver to the transmitter to indicate if a certain performance indicator measured by the receiver has increased or decreased. This means for example when the maximum of the performance indicator is of interest a one (or zero) is sent if the value is greater and a zero (or one) if the value is equal or less. When the minimum of the performance indicator the same can be done when the value is less. The reference value for comparison can either be the previous value, see an example in FIG. 6 or the maximum/minimum value within the time the transmitter started to change the settings. Whenever a new maximum/minimum value is received the maximum/minimum value used for comparison is updated, see example in FIG. 7. With this solution the transmitter can change the settings of the system to any desired configuration not limited by the feedback channel. The initial setting to start from is most likely obtained by state-of-the-art mechanisms, but can also be a random setting. With respect to the examples this can be:

First, the modulation and/or code rates to select from. The transmitter can change the code-rate, for example a lower code-rate to increase the effective data-throughput. With effective data-throughput the throughput without redundancy added by code and only successful received and decoded messages is meant. This means on one hand by increasing the code-rate redundancy is added and the effective throughout decreased on the other hand decreasing the code rate increases the rate of not-successful received and decoded messages. In a feedback system the receiver signals the code-rate to be used to the transmitter from a limited set. With the solution proposed herein the transmitter can change the code-rate to other values not included in the limited set (but technical possible in the system) and get a feedback from the receiver if the effective data-throughput has increased or not.

Second, the set of transmitters or a subset thereof. In this example the receiver has a set of transmitter to choose from for transmission. The receiver can either indicate the specific transmitters to be used, or an indicator for a certain set of transmitters. However, whenever the number of transmitters is large, also the feedback that may be used is large. By measuring again a certain value, for example receiver signals strength or signal-to-noise ratio (SNR) or signal-to-noise+interference ration SINR at the receiver, the set of transmitters can be changed and the receiver indicates if the value increased or decreases by either a one or zero.

Third, a wireless system with a multi-antenna transmitter, the number of beamformers/precoders. In a wireless system where the transmitter has multiple antennas (e.g. in WiFi, LTE) the number of beamformers/precoder to be used is defined in a codebook where the receiver can select from, see FIG. 6. With a large codebook also the amount of feedback to send an indicator increases. With the proposed one bit feedback solution, the transmitter can change the beamformer/precoder to improve a certain performance indicator at the receiver.

This performance indicators can be but not limited to, receive signal power, SNR, SINR, block error rate, bit error rate, interference+noise power.

Fourth, a wireless system with a pool of resources, e.g. in frequency, space or code domain. In a wireless system with a large pool of resources, e.g. in frequency, space or code domain, the user has to report which resource is the best to be used by the transmitter. This involves a large amount of feedback from the receiver. This problem is even more severe in shared access system when multiple receiver feedback their resource using the same uplink channel, either control, feedback, or data channel. With the proposed one bit solution, the transmitter can schedule a certain resource to the receiver, and the start changing the resources assigned to the receiver, based on the one bit feedback of the user. Again the measured value can be but not limited to it receive signal power, SNR, SINR, block error rate, bit error rate, interference+noise power.

FIGS. 6*a*-6*c* show schematic block diagrams of a communication system 180 comprising a transmitter 100 and a receiver 150 at different time points. The transmitter 100 and the receiver 150 communicate over a communication channel 182 that is overlayed with noise 184. In other words, FIGS. 6*a*-6*c* show a 1 bit feedback based communication system with an example where the previous value is used for comparison. Here the minimum is of interest and a smaller measured performance indicator is indicated with a zero and an equal or larger value with a one.

In FIG. 6*a*, at a first time point (time point 1), the transmitter 100 is configured to use a first transmission characteristic (configuration n1) for communication with the receiver 150, wherein the receiver 150 is configured to determine (e.g., measure) a reception quality, to obtain a first performance indicator (PI1).

In FIG. 6*b*, at a second time point (time point 2), the transmitter 100 is configured to change the transmission characteristic from the first transmission characteristic (configuration n1) to a second transmission characteristic (configuration n2), different from the first transmission characteristic, wherein the receiver 150 is configured to determine a reception quality, in order to obtain a second performance indicator (PI2), to compare the second performance indicator (PI2) with a reference value, and to provide the 1 bit feedback information based on the comparison between the second performance indicator (PI2) and the reference value. As shown in FIG. 6*b* by way of example, the reference value is the previous performance indicator, i.e. the first performance indicator (PI1). In the example shown in FIG. 6*b*, the second performance indicator (PI2) is smaller than the first performance indicator (PI1), such that the 1 bit feedback information comprises a logic 0.

In FIG. 6*c*, at a third time point (time point 3), the transmitter 100 is configured to change the transmission characteristic from the second transmission characteristic (configuration n2) to a third transmission characteristic (configuration n3), different from the second transmission characteristic, wherein the receiver 150 is configured to determine a reception quality, in order to obtain a third performance indicator (PI3), to compare the third performance indicator (PI3) with a reference value, and to provide the 1 bit feedback information based on the comparison between the third performance indicator (PI3) and the reference value. As shown in FIG. 6*c* by way of example, the reference value is the previous performance indicator, i.e. the second performance indicator (PI2). In the example shown in FIG. 6*c*, the third performance indicator (PI3) is greater than or equal to the second performance indicator (PI2), such that the 1 bit feedback information comprises a logic 1.

FIGS. 7*a*-7*e* show schematic block diagrams of a communication system 180 comprising a transmitter 100 and a receiver 150 at different time points. The transmitter 100 and the receiver 150 communicate over a communication channel 182 that is overlayed with noise 184. In other words, FIGS. 7*a*-7*e* show a 1 bit feedback based communication system with an example where the minimum value is used for comparison.

In FIG. 7*a*, at a first time point (time point 1), the transmitter 100 is configured to use a first transmission characteristic (configuration n1) for communication with the receiver 150, wherein the receiver 150 is configured to determine (e.g., measure) a reception quality, to obtain a first performance indicator (PI1).

In FIG. 7*b*, at a second time point (time point 2), the transmitter 100 is configured to change the transmission characteristic from the first transmission characteristic (configuration n1) to a second transmission characteristic (configuration n2), different from the first transmission characteristic, wherein the receiver 150 is configured to determine a reception quality, in order to obtain a second performance indicator (PI2), to compare the second performance indicator (PI2) with a reference indicator, and to provide the 1 bit feedback information based on the comparison between the second performance indicator (PI2) and the reference indicator. As shown in FIG. 7*b* by way of example, the reference indicator is the minimum indicator of the previous performance indicators. Since the first performance indicator (PI1) is the minimum indicator of the previous performance indicators or the only available performance indicator, the receiver 150 is configured to compare the second performance indicator (PI2) and the first performance indicator (PI1). In the example shown in FIG. 7*b*, the second performance indicator (PI2) is smaller than the first performance indicator (PI1), such that the 1 bit feedback information comprises a logic 0. The second performance indicator is the new reference indicator.

In FIG. 7*c*, at a third time point (time point 3), the transmitter 100 is configured to change the transmission characteristic from the second transmission characteristic (configuration n2) to a third transmission characteristic (configuration n3), different from the second transmission characteristic, wherein the receiver 150 is configured to determine a reception quality, in order to obtain a third performance indicator (PI3), to compare the third performance indicator (PI3) with a reference value, and to provide the 1 bit feedback information based on the comparison between the third performance indicator (PI3) and the reference value. As shown in FIG. 7*c* by way of example, the reference indicator is the minimum indicator of the previous performance indicators. Since the second performance indicator (PI2) is the minimum indicator of the previous performance indicators, the receiver 150 is configured to compare the second performance indicator (PI2) and the third performance indicator (PI3). In the example shown in FIG. 7*c*, the third performance indicator (PI3) is greater than or equal to the second performance indicator (PI2), such that the 1 bit feedback information comprises a logic 1. The second performance indicator is still the reference indicator.

In FIG. 7d, at a fourth time point (time point 4), the transmitter 100 is configured to change the transmission characteristic from the third transmission characteristic (configuration n3) to a fourth transmission characteristic (configuration n4), different from the third transmission characteristic, wherein the receiver 150 is configured to determine a reception quality, in order to obtain a fourth performance indicator (PI4), to compare the fourth performance indicator (PI4) with a reference value, and to provide the 1 bit feedback information based on the comparison between the fourth performance indicator (PI4) and the reference value. As shown in FIG. 7d by way of example, the reference indicator is the minimum indicator of the previous performance indicators. Since the second performance indicator (PI2) is the minimum indicator of the previous performance indicators, the receiver 150 is configured to compare the second performance indicator (PI2) and the fourth performance indicator (PI4). In the example shown in FIG. 7c, the fourth performance indicator (PI4) is smaller than the second performance indicator (PI2), such that the 1 bit feedback information comprises a logic 0. The fourth performance indicator is the new reference indicator.

In FIG. 7e, at a firth time point (time point 5), the transmitter 100 is configured to change the transmission characteristic from the fourth transmission characteristic (configuration n4) to a fifth transmission characteristic (configuration n5), different from the fourth transmission characteristic, wherein the receiver 150 is configured to determine a reception quality, in order to obtain a fifth performance indicator (PI5), to compare the fifth performance indicator (PI5) with a reference value, and to provide the 1 bit feedback information based on the comparison between the fifth performance indicator (PI5) and the reference value. As shown in FIG. 7e by way of example, the reference indicator is the minimum indicator of the previous performance indicators. Since the fourth performance indicator (PI4) is the minimum indicator of the previous performance indicators, the receiver 150 is configured to compare the fifth performance indicator (PI5) and the fourth performance indicator (PI4). In the example shown in FIG. 7e, the fifth performance indicator (PI5) is greater than or equal to the fourth performance indicator (PI4), such that the 1 bit feedback information comprises a logic 1. The fourth performance indicator is still the reference indicator.

Figure 8:
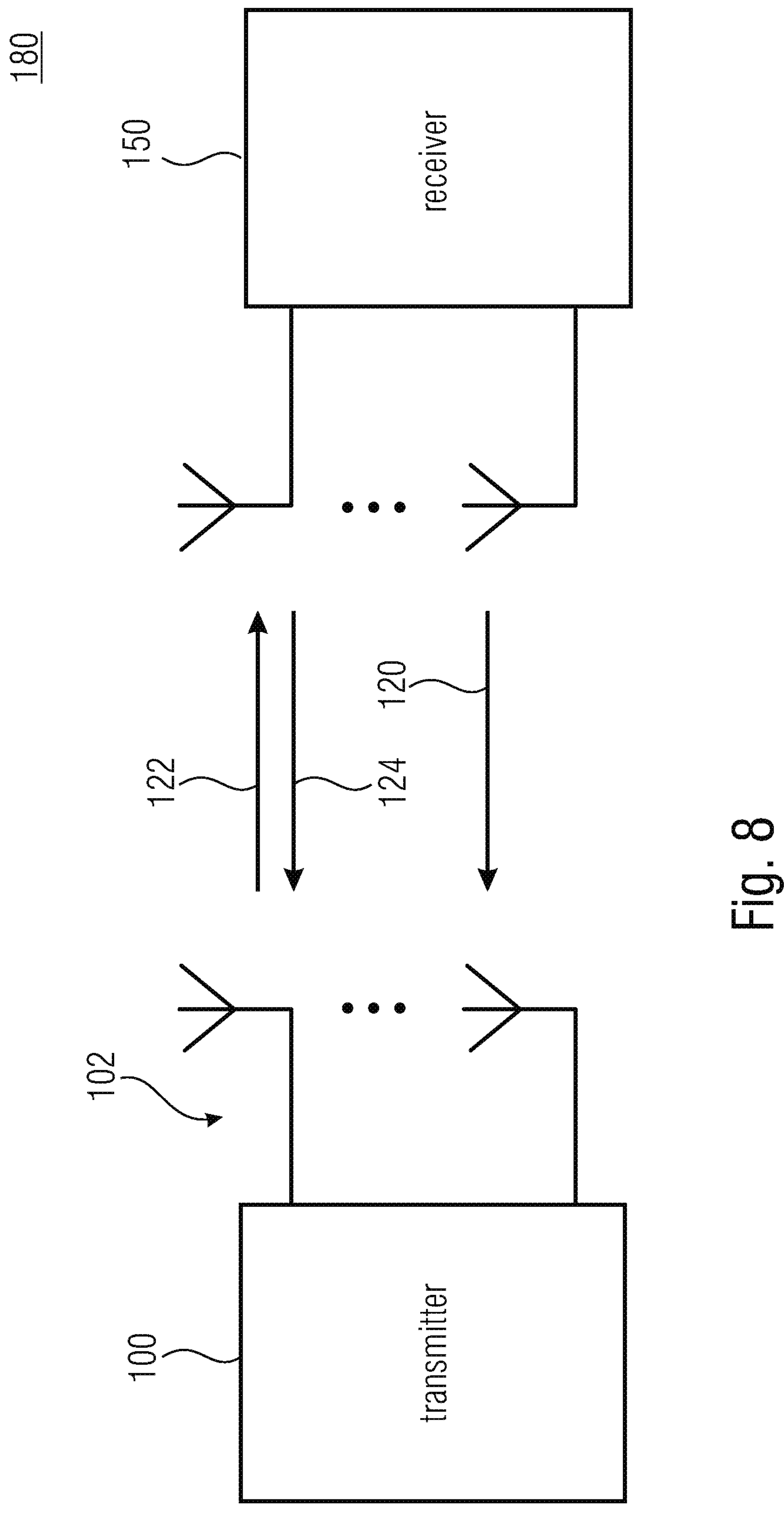
FIG. 8 show a schematic block diagram of a communication system comprising a multi-antenna transmitter and a receiver, according to an embodiment.

FIG. 8 shows a schematic block diagram of a communication system 180 comprising a multi-antenna transmitter 100 and a receiver 150, according to an embodiment.

The transmitter 100 can be configured to establish a communication link to the receiver 150, wherein the multi-antenna transmitter 100 can be configured to change a beamforming pattern used for communication with the receiver 150, wherein the multi-antenna transmitter 100 can be configured to further change the beamforming pattern used for the communication with the receiver 150 in dependence on a feedback information 120 received from the receiver 150, the feedback information 120 indicating whether a received SINR has changed or in which direction the received SINR has changed, or whether a characteristic of the beam pattern should be maintained.

The receiver 150 can be configured to configured to establish a communication link with the multi-antenna transmitter 100, wherein the receiver 150 can be configured to determine a SINR of the communication link, wherein the receiver 150 can be configured to transmit a feedback information 120 to the multi-antenna transmitter 100 indicating whether a received SINR has changed or in which direction the received SINR has changed, or whether a characteristic of the beam pattern should be maintained.

For example, the multi-antenna transmitter 100 can comprise a plurality of antennas 102 for transmitting signals 122 to the receiver 150 and receiving signals 124 from the receiver 150. The receiver 150 can comprise one antenna 152 or more than one antennas 152 (i.e. the receiver 150 can be a multi-antenna receiver) for receiving signals 122 from the transmitter 100 and transmitting signals 124 to the transmitter 100.

The feedback information 120 can comprise exactly 1 bit, i.e. a logic 1 or a logic 0.

For example, the feedback information 120 can comprise a first value (e.g., logic 1) when a value of the received SINR is greater than a reference value and a second value (e.g., logic 0), different from the first value, when a value of the received SINR is equal to or smaller than the reference value. Naturally, the feedback information can also comprise a first value (e.g., logic 1) when a value of the received SINR is smaller than a reference value and a second value (e.g., logic 0) when a value of the received SINR is equal to or greater than the reference value. The reference value can be a previous value of the SINR or a minimum or maximum value of a plurality of previous values of the SINR.

In embodiments, the multi-antenna transmitter 100 can be configured to select, in a first operation mode, one out of a plurality of different beamforming patterns (e.g., from a codebook) for communication with the receiver 150 in dependence on a selection information received from the receiver 150, the selection information (e.g., a codebook index) indicating the one beamforming pattern out of the plurality of different beamforming patterns to be used by the multi-antenna transmitter.

Further, the multi-antenna transmitter 100 can be configured to change, in a second operation mode, the beamforming pattern used for communication with the receiver 150, wherein the multi-antenna transmitter 100 can be configured to further change the beamforming pattern used for the communication with the receiver in dependence on the feedback information received from the receiver.

In embodiments, the receiver 150 can be configured to select, in the first operation mode, one out of a plurality of different beamforming patterns (e.g., from a codebook) in dependence on the determined SINR, and to transmit a selection information (e.g., a codebook index) to the multi-antenna transmitter 100 indicating the one beamforming pattern out of the plurality of different beamforming patterns to be used by the multi-antenna transmitter 100.

Further, the receiver 150 can be configured to transmit, in the second operation mode, the feedback information 120 to the multi-antenna transmitter 100.

In embodiments, the multi-antenna transmitter 100 can be configured to switch to the first operation mode for establishing the communication link between the multi-antenna transmitter 100 and the receiver 150, and wherein the multi-antenna transmitter 100 can be configured to switch to the second operation mode for a period of time encompassing at least two changes of the beam pattern.

Similarly, the receiver 150 can receiver is configured to switch to the first operation mode for establishing the communication link between the multi-antenna transmitter 100 and the receiver 150, and wherein the receiver 150 is configured to switch to the second operation mode for a period of time encompassing at least two changes of the beam pattern.

The multi-antenna transmitter 100 can be configured transmit a signaling information to the receiver 150, the signaling information signaling a change of mode of operation to the receiver.

The receiver 150 can be configured to switch to the first operation mode or to the second information in dependence on the signaling information received from the multi-antenna transmitter 100.

In embodiments, a large codebook without additional signaling in the PDSCH can be used by using a 1-bit feedback from the receiver 150 to the transmitter 100 indicating if the receive SINR is increased or not after changing the selected beamformer/precoder for the receiver on the transmitter side without informing the receiver about the change.

Embodiments enable a virtually unlimited codebook or quantization of the channel. The codebook structure of the full-dimension codebook C_FD is in principal the following assuming a rectangular shape of antenna array at the transmitter:

$$C\_FD=C\_v\otimes C\_h,$$

where C_v is the codebook for elevation beamforming and C_h the codebook for azimuth beamforming. Details can be found in [3GPP, "Study on Elevation Beamforming/Full-Dimension (FD) MIMO for LTE", 3rd Generation Partnership Project, vol. V13.0.0, Jul. 2015] and [Y. H. Nam, M. S. Rahman, Y. Li, G. Xu, E. Onggosanusi, J. Zhang and J. Y. Seol, "Full dimension MIMO for LTE-Advanced and 5G", Information Theory and Applications Workshop (ITA), 2015, pp. 143-148, Feb. 2015]. To construct C_v and C_h Discrete Fourier Transform (DFT) matrices can be used. This means that a structured codebook where a certain column (stream) of the codebook corresponds to a certain direction. This side information can be exploited in the following steps:

1. Each receiver selects the most appropriate beamformer (column) from C_FD;
2. Each receiver fed back the precoding matrix indicator (PMI) corresponding to the selected entry from step 1;
3. The transmitter starts transmission to the receiver with the beamformer selected in step 2;
4. The transmitter informs the receiver that now the fast 1 bit feedback mode is started;
5. The transmitter starts to modify the beamformer such that the main lobe of the beam is different to the beambeamformer used in step 3 or previous iteration of step 5;
6. The receiver sends a one bit feedback if the receive SINR of the beamformer used in step 5 is higher (1 is fed back) or lower (0 is fed back) compared to the SINR receive with the beamformer in step 3 or a previous iteration of step 5.

Based on the feedback in step 6 it is up to the specific algorithm of each operator continuing with step 5 or to terminate the procedure of further beamformer changing.

Figure 9:
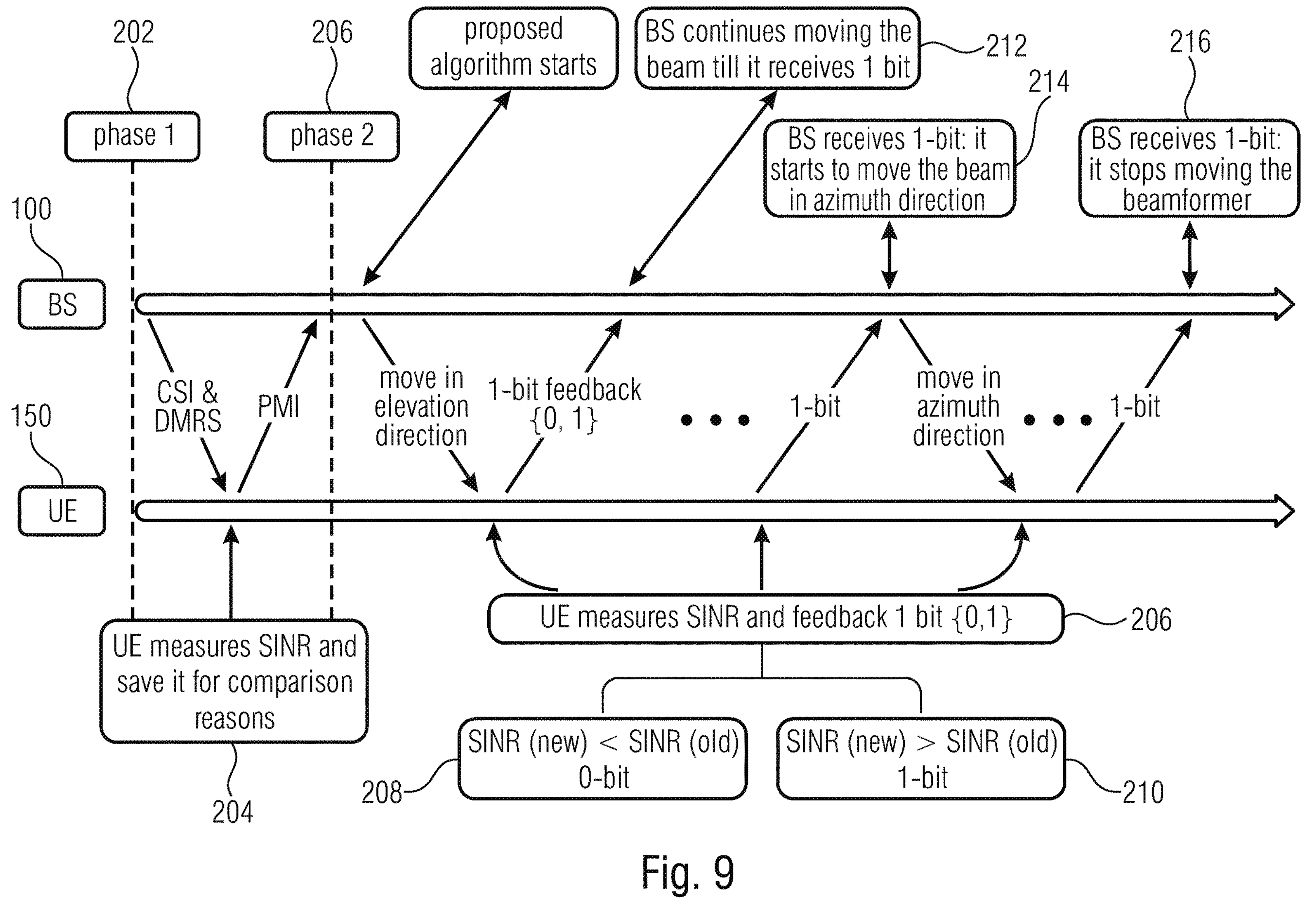
FIG. 9 shows a flowchart of method for operating a communication system comprising a multi-antenna transmitter and a (MIMO) receiver, according to an embodiment.

FIG. 9 shows a flowchart of method 200 for operating a communication system comprising a multi-antenna transmitter 100 and a (multi-antenna) receiver 150, according to an embodiment.

In other words, FIG. 9 illustrates one realization of the procedure where the beamformer is changed in azimuth and elevation direction separately after each other.

In a first operation mode (first phase) 202, the receiver 150 can be configured select one out of a plurality of different beamforming patterns (e.g., from a codebook) in dependence on a determined SINR, and to transmit a selection information (e.g., a codebook index) to the multi-antenna transmitter 100 indicating the one beamforming pattern out of the plurality of different beamforming patterns to be used by the multi-antenna transmitter 100. The multi-antenna transmitter 100 can be configured to select one out of the plurality of different beamforming patterns (e.g., from the codebook) for communication with the receiver in dependence on the selection information (e.g., the codebook index) received from the receiver 150.

For example, as shown in FIG. 9, in the first operation mode 202, the transmitter 100 (e.g., a base station) can transmit a channel state information (CSI) and demodulation reference signals DRMS to the receiver 150 (e.g., a user equipment (UE)). The receiver 150 can be configured to measure 204 a SINR and save it for comparison reasons. Further, the receiver 150 can be configured to transmit a PMI to the transmitter 100.

In a second operation mode (phase 2) 206, the multi-antenna transmitter can be configured to change the beamforming pattern used for communication with the receiver 150. The receiver can be configured to determine a SINR of the communication link and to transmit a feedback information to the multi-antenna transmitter 100 indicating whether a received SINR is higher (e.g., logic 1) or lower (e.g., logic 0). The multi-antenna transmitter 100 can be configured to further change the beamforming pattern used for the communication with the receiver 150 in dependence on the feedback information received from the receiver 150. Afterwards, the multi-antenna transmitter 100 can be configured to iteratively further change the beamforming pattern used for the communication with the receiver 150 in dependence on the feedback information received from the receiver.

The multi-antenna transmitter 100 can be configured to change or further change the beam pattern by changing a direction of a main lobe of the beam pattern. Thereby, the multi-antenna transmitter can be configured to change or further change the beam pattern by changing a direction of a main lobe of the beam pattern in azimuth direction and elevation direction separately after each other or jointly.

As indicated in FIG. 9, the multi-antenna transmitter 100 can be configured to change or further change the beam pattern by continuously changing a main lobe of the beam pattern in the same direction until the feedback information indicates that the characteristic of the beam pattern should be maintained. For example, in the feedback information another bit can be added (e.g., in total a two bit feedback) indicating that the transmission strategy is maintained or should be updated using prediction or other side information. Alternatively, information for how long the transmission strategy should be maintained fixed can be included.

In detail, in the second operation mode (second phase) 206, the transmitter 100 can be configured to move the main lobe in elevation direction. The receiver can be configured to measure 206 the SINR and transmit the 1 bit feedback information to the multi-antenna transmitter 100 in dependence on the measured SINR. For example, if a current SINR (or new SINR) is smaller 208 than a previous SINR (or old SINR), then the feedback information may comprise a logic 0, wherein if the current SINR (or new SINR) is greater 210 than the previous SINR (or old SINR), then the feedback information may comprise a logic 1. Thereby, the multi-antenna transmitter can be configured to continue moving 212 the beam till it receives a logic, i.e. until the current SINR (or new SINR) is greater than the previous SINR (or old SINR). This process can be repeated until the multi-antenna transmitter receives 1 bit when it starts to move 214 the beam in azimuth direction. Similarly, the receiver can be configured to measure 206 the SINR and transmit the 1 bit feedback information to the multi-antenna transmitter 100 in dependence on the measured SINR. When the multi-antenna transmitter 100 receives 1 bit it stops moving 216 the beamformer.

Figure 10:
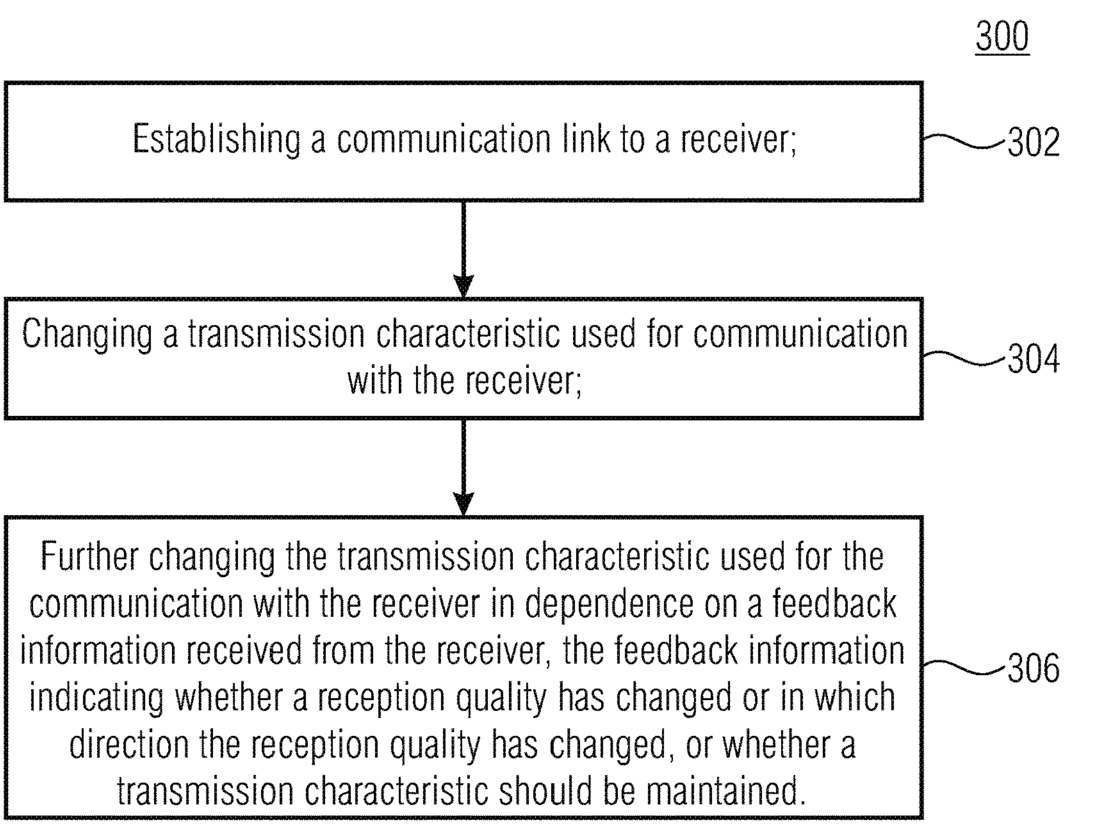
FIG. 10 shows a flowchart of a method for transmitting according to an embodiment.

FIG. 10 shows a flowchart of a method 300 for transmitting. The method 300 comprises a step 302 of establishing a communication link to a receiver. Further, the method 300 comprises a step 304 of changing a transmission characteristic used for communication with the receiver.

Further, the method 300 comprises a step 306 of further changing the transmission characteristic used for the communication with the receiver in dependence on a feedback information received from the receiver, the feedback information indicating whether a reception quality has changed or in which direction the reception quality has changed, or whether a transmission characteristic should be maintained.

Figure 11:
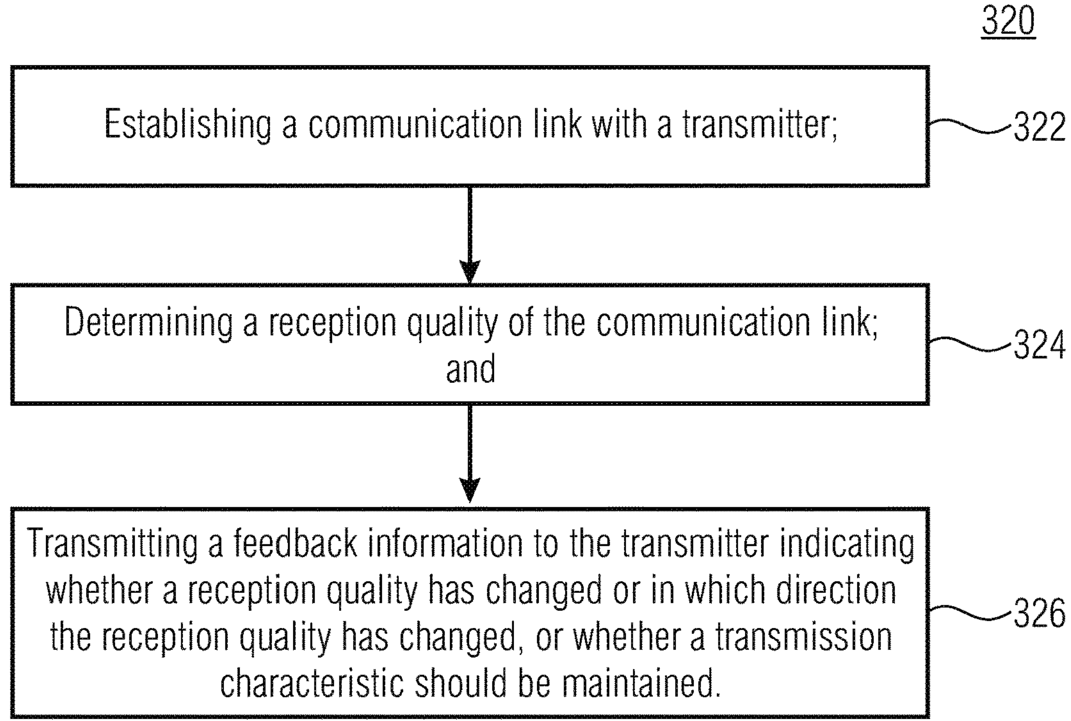
FIG. 11 shows a flowchart of a method for receiving according to an embodiment.

FIG. 11 shows a flowchart of a method 320 for receiving. The method 320 comprises a step 322 of establishing a communication link with a transmitter. Further, the method 300 comprises a step 324 of determining a reception quality of the communication link. Further, the method 320 comprises a step 326 of transmitting a feedback information to the transmitter indicating whether a reception quality has changed or in which direction the reception quality has changed, or whether a transmission characteristic should be maintained.

In embodiments, an additional fast 1 bit feedback according to the change rate of the beamformer at the transmitter is provided and incorporated in the protocol indicating if a changed beamformer has a higher receive SNR/SINR or not than a previous beamformer, either compared to the last or the maximum within a certain window of the past.

Embodiments provide at least one out of the following advantages. First, a receive SNR is increased by utilizing virtually a codebook with infinity size, because any step size of the changing the beamformer direction can be selected and is only limited by the hardware at the transmitter. Second, no additional signaling overhead in the PDSCH is required. Third, a very short feedback interval every TTI (TTI=transmission time interval) is enabled due to the low additional 1 bit feedback Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein.

The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein.

In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A transmitter for communicating with a receiver, wherein in a first operation mode the transmitter is configured to change a transmit power used for communication with the receiver, wherein the transmitter is configured to further change the transmit power used for the communication with the receiver in dependence on a feedback information received from the receiver, the feedback information indicating whether a reception quality has increased or decreased, or whether the transmit power should be maintained, wherein in a second operation mode the transmitter is configured to select one out of a plurality of different transmit powers for communication with the receiver in dependence on a selection information received from the receiver, the selection information indicating the one transmit power out of the plurality of different transmit powers to be used by the transmitter.

2. The transmitter according to claim 1, wherein the feedback information comprises exactly 1 bit.

3. The transmitter according to claim 2, wherein the feedback information comprises a first value when a value of the reception quality detected by the receiver is greater than a reference value and a second value, different from the first value, when a value of the reception quality detected by the receiver is equal to or smaller than the reference value;

or wherein the feedback information comprises a first value when a value of the reception quality detected by the receiver is smaller than a reference value and a second value, different from the first value, when a value of the reception quality detected by the receiver is equal to or greater than the reference value;

wherein the reference value is a previous value of the reception quality or a minimum or maximum value of a plurality of previous values of the reception quality.

4. The transmitter according to claim 1, wherein the reception quality is at least one out of a signal-to-interference-plus-noise ratio, a signal-to-noise ratio, a channel quality indicator, a received signal power and an effective data throughput.

5. The transmitter according to claim 1, wherein the transmitter is configured to switch to the first operation mode for establishing a communication link between the transmitter and the receiver, and wherein the transmitter is configured to switch to the second operation mode for a period of time encompassing at least two changes of the transmit power.

6. The transmitter according to claim 1, wherein the transmitter is configured to signal a change of mode of operation to the receiver, or wherein the transmitter is configured to change the mode of operation in dependence on a signal information received from the receiver.

7. The transmitter according to claim 1, wherein the transmitter is configured to not use a downlink channel from the transmitter to the receiver for transmitting control information in the second operation mode, the control information indicating the used transmit power to the receiver.

8. The transmitter according to claim 1, wherein the transmitter is configured to iteratively further change the transmit power used for the communication with the receiver in dependence on the feedback information received from the receiver.

9. A receiver, wherein the receiver is configured to establish a communication link with a transmitter, wherein the receiver is configured to determine a reception quality of the communication link, wherein in a first operation mode the receiver is configured to transmit a feedback information to the transmitter indicating whether a reception quality has increased or decreased, or whether a transmit power should be maintained, wherein in a second operation mode the receiver is configured select one out of a plurality of different transmit powers in dependence on the determined reception quality, and to transmit a selection information to the transmitter indicating the one transmit power out of the plurality of different transmit powers to be used by the transmitter.

10. The receiver according to claim 9, wherein the feedback information comprises exactly 1 bit.

11. The receiver according to claim 10, wherein the feedback information comprises a first value when a value of the reception quality detected by the receiver is greater than a reference value and a second value, different from the first value, when a value of the reception quality detected by the receiver is equal to or smaller than the reference value;

or wherein the feedback information comprises a first value when a value of the reception quality detected by the receiver is smaller than a reference value and a second value, different from the first value, when a value of the reception quality detected by the receiver is equal to or greater than the reference value;

wherein the reference value is a previous value of the reception quality or a minimum or maximum value of a plurality of previous values of the reception quality.

12. The receiver according to claim 9, wherein the reception quality is at least one out of a signal-to-interference-plus-noise ratio, a signal-to-noise ratio, a channel quality indicator, a received signal power and an effective data throughput.

13. The receiver according to claim 9, wherein the receiver is configured to switch to the first operation mode for establishing the communication link between the transmitter and the receiver, and wherein the receiver is configured to switch to the second operation mode for a period of time encompassing at least two changes of the transmit power.

14. The receiver according to claim 9, wherein the receiver is configured to switch to the first operation mode or to the second operation mode in dependence on a signaling information received from the transmitter, or wherein the receiver is configured to switch to the first operation mode or to the second operation mode and to signal a current operation mode to the transmitter.

15. The receiver according to claim 9, wherein the receiver is configured to not use a downlink channel from the transmitter to the receiver for receiving control information in the second operation mode, the control information indicating the used transmit power to the receiver.

16. A system, comprising:

a transmitter for communicating with a receiver, wherein in a first operation mode the transmitter is configured to change a transmit power used for the communication with the receiver, wherein the transmitter is configured to further change the transmit power used for the communication with the receiver in dependence on a feedback information received from the receiver, the feedback information indicating whether a reception quality has increased or decreased, or whether the transmit power should be maintained, wherein in a second operation mode the transmitter is configured to select one out of a plurality of different transmit powers for communication with the receiver in dependence on a selection information received from the receiver; and a receiver according to claim 9.

17. A method for transmitting, the method comprising:

establishing a communication link to a receiver;

in a first operation mode, changing a transmit power used for communication with the receiver; and further changing the transmit power used for the communication with the receiver in dependence on a feedback information received from the receiver, the feedback information indicating whether a reception quality has increased or decreased, or whether a transmit power should be maintained, in a second operation mode, selecting one out of a plurality of different transmit powers for communication with the receiver in dependence on a selection information received from the receiver.

18. A method for receiving, the method comprising:

establishing a communication link with a transmitter;

determining a reception quality of the communication link; and in a first operation mode transmitting a feedback information to the transmitter indicating whether a reception quality has increased or decreased, or whether a transmit power should be maintained, in a second operation mode, selecting one out of a plurality of different transmit powers in dependence on the determined reception quality, and transmitting a selection information to the transmitter indicating the one transmit power out of the plurality of different transmit powers to be used by the transmitter.

19. A non-transitory digital storage medium having a computer program stored thereon to perform a method for transmitting, the method comprising:

establishing a communication link to a receiver;

in a first operation mode, changing a transmit power used for communication with the receiver;

further changing the transmit power used for the communication with the receiver in dependence on a feedback information received from the receiver, the feedback information indicating whether a reception quality has increased or decreased, or whether a transmit power should be maintained;

in a second operation mode, selecting one out of a plurality of different transmit powers for communication with the receiver in dependence on a selection information received from the receiver;

when said computer program is run by a computer.

20. A non-transitory digital storage medium having a computer program stored thereon to perform a method for receiving, the method comprising:

establishing a communication link with a transmitter;

determining a reception quality of the communication link; and in a first operation mode transmitting a feedback information to the transmitter indicating whether a reception quality has increased or decreased, or whether a transmit power should be maintained;

in a second operation mode, selecting one out of a plurality of different transmit powers in dependence on the determined reception quality, and transmitting a selection information to the transmitter indicating the one transmit power out of the plurality of different transmit powers to be used by the transmitter;

when said computer program is run by a computer.

* * * * *